United States Patent
Dry et al.

(10) Patent No.: US 11,142,097 B2
(45) Date of Patent: Oct. 12, 2021

(54) TRACK ASSEMBLY FOR A VEHICLE

(71) Applicant: Ford Global Technologies, LLC, Dearborn, MI (US)

(72) Inventors: Alan George Dry, Grosse Pointe Woods, MI (US); Johnathan Andrew Line, Northville, MI (US); Joseph Michael Kish, Canton, MI (US); Jimmy Moua, Canton, MI (US); Joseph Raymond Comeau, Rochester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 134 days.

(21) Appl. No.: 16/401,537

(22) Filed: May 2, 2019

(65) Prior Publication Data
US 2020/0346564 A1   Nov. 5, 2020

(51) Int. Cl.
| | | |
|---|---|---|
| *B60N 2/07* | (2006.01) | |
| *B60R 7/04* | (2006.01) | |
| *B60N 2/08* | (2006.01) | |

(52) U.S. Cl.
CPC ............. *B60N 2/07* (2013.01); *B60N 2/08* (2013.01); *B60R 7/04* (2013.01)

(58) Field of Classification Search
CPC .......... B60N 2/0868; B60N 2/07; B60N 2/08; B64D 11/0624; B60R 7/04
See application file for complete search history.

(56) References Cited

U.S. PATENT DOCUMENTS

| | | | | |
|---|---|---|---|---|
| 3,109,598 A | * | 11/1963 | Morgan | B60Q 1/2615 362/549 |
| 3,827,365 A | * | 8/1974 | Coppel | B66C 13/12 104/88.03 |
| 5,759,051 A | * | 6/1998 | Cancellieri | H01R 25/142 439/118 |
| 6,008,547 A | * | 12/1999 | Dobler | B60R 16/027 307/10.1 |
| 6,203,088 B1 | * | 3/2001 | Fernandez | B60R 7/04 296/37.8 |
| 6,267,430 B1 | | 7/2001 | Cresseaux | |
| 6,752,444 B2 | * | 6/2004 | Kitano | B60R 7/04 296/184.1 |
| 7,185,850 B2 | | 3/2007 | Callahan et al. | |
| 7,188,805 B2 | | 3/2007 | Henley et al. | |
| 7,429,190 B2 | | 9/2008 | Hueber | |
| 7,481,475 B1 | * | 1/2009 | Lim | B60R 7/04 296/24.34 |
| 8,382,057 B2 | | 2/2013 | Napau et al. | |
| 9,789,965 B2 | * | 10/2017 | Benthien | B60N 2/067 |
| 9,887,586 B2 | * | 2/2018 | Schomacker | H04B 5/0037 |

(Continued)

FOREIGN PATENT DOCUMENTS

| | | | | |
|---|---|---|---|---|
| DE | 102016202158 A1 | * | 8/2017 | ......... B60N 2/0722 |
| WO | WO-0187665 A1 | * | 11/2001 | ......... B60N 2/0705 |

(Continued)

*Primary Examiner* — Eret C McNichols
(74) *Attorney, Agent, or Firm* — David Coppiellie; Price Heneveld LLP

(57) ABSTRACT

A track assembly for a vehicle includes a rail assembly. The rail assembly defines an interior aperture. The interior aperture may be inaccessible from a top side, a first lateral side, and a second lateral side of the rail assembly.

20 Claims, 11 Drawing Sheets

(56) References Cited

U.S. PATENT DOCUMENTS

| | | | |
|---|---|---|---|
| 9,963,236 B2 | 5/2018 | Silva et al. | |
| 10,214,168 B1* | 2/2019 | Yamamoto | B60R 16/027 |
| 2005/0116487 A1* | 6/2005 | Isaacson | B60R 11/02 |
| | | | 296/37.8 |
| 2005/0215095 A1* | 9/2005 | Mitchell | H01R 25/162 |
| | | | 439/110 |
| 2005/0230543 A1* | 10/2005 | Laib | B64D 11/0696 |
| | | | 244/118.5 |
| 2005/0242604 A1* | 11/2005 | Bonnes | B60N 2/0818 |
| | | | 296/35.1 |
| 2005/0247232 A1* | 11/2005 | Hatta | B61D 33/0057 |
| | | | 104/88.01 |
| 2005/0258663 A1* | 11/2005 | Huisingh | B60R 7/04 |
| | | | 296/37.7 |
| 2005/0258676 A1* | 11/2005 | Mitchell | B64D 11/0624 |
| | | | 297/216.13 |
| 2006/0049311 A1* | 3/2006 | Callahan | B64D 11/06 |
| | | | 244/118.6 |
| 2006/0276065 A1* | 12/2006 | Hansen | B60R 7/04 |
| | | | 439/110 |
| 2007/0123075 A1* | 5/2007 | Insalaco | H02G 3/388 |
| | | | 439/120 |
| 2009/0295223 A1* | 12/2009 | Bauer | H04L 25/02 |
| | | | 307/9.1 |
| 2009/0298326 A1* | 12/2009 | Van Der Mee | B64D 11/06 |
| | | | 439/501 |
| 2013/0299439 A1* | 11/2013 | Sid | A47F 11/10 |
| | | | 211/134 |
| 2016/0362181 A1* | 12/2016 | Neville | B64D 11/0624 |
| 2019/0126786 A1* | 5/2019 | Dry | B60N 2/14 |
| 2019/0263295 A1* | 8/2019 | Dry | B60N 2/01 |
| 2019/0337471 A1* | 11/2019 | Brehm | B60N 2/08 |
| 2020/0079243 A1* | 3/2020 | Bork | B60N 2/0228 |
| 2020/0189511 A1* | 6/2020 | Ricart | B60R 21/207 |
| 2020/0194936 A1* | 6/2020 | Ricart | H01R 13/73 |
| 2020/0194948 A1* | 6/2020 | Lammers | H01R 13/113 |
| 2020/0207241 A1* | 7/2020 | Moulin | B60N 2/0806 |
| 2020/0215998 A1* | 7/2020 | Yamamoto | B60R 16/027 |
| 2020/0223378 A1* | 7/2020 | Mushiake | H04B 5/0037 |
| 2020/0262367 A1* | 8/2020 | Fernandez Banares | |
| | | | B60R 16/027 |
| 2020/0269754 A1* | 8/2020 | Ricart | B60N 2/0722 |
| 2020/0282871 A1* | 9/2020 | Ricart | B60N 2/0707 |
| 2020/0290484 A1* | 9/2020 | Line | B60N 2/0715 |
| 2020/0307417 A1* | 10/2020 | Oman | B60R 16/027 |
| 2020/0307475 A1* | 10/2020 | Yamamoto | B60R 16/027 |
| 2020/0346531 A1* | 11/2020 | Dry | E05D 15/0686 |

FOREIGN PATENT DOCUMENTS

| | | |
|---|---|---|
| WO | 2017156586 A1 | 9/2017 |
| WO | 2017164914 A1 | 9/2017 |

* cited by examiner

TRACK ASSEMBLY FOR A VEHICLE

FIELD OF THE DISCLOSURE

The present disclosure generally relates to a track assembly. More specifically, the present disclosure relates to a track assembly for a vehicle.

BACKGROUND OF THE INVENTION

Vehicles are often provided with some degree of adjustability in a cabin of the vehicle. For example, components of the vehicle that are provided in the cabin (e.g., seating assemblies) can be adjusted to meet the preferences of occupants of various sizes. Additionally, in some examples, vehicles are capable of adjustments to components of the cabin to increase a cargo area of the vehicle. However, additional solutions are needed that enable increased adjustability in the cabin of the vehicle.

SUMMARY OF THE INVENTION

According to a first aspect of the present disclosure, a track assembly for a vehicle includes a rail assembly. The rail assembly defines an interior aperture. The interior aperture is inaccessible from a top side, a first lateral side, and a second lateral side of the rail assembly.

According to a second aspect of the present disclosure, a vehicle includes a cabin. A track assembly is coupled to a portion of the cabin. The track assembly includes a retention structure, a carriage structure, and a rail assembly. The carriage structure extends through the retention structure. The rail assembly receives the retention structure and the carriage structure such that the retention structure and the carriage structure slidably couple with the rail assembly. The rail assembly defines an interior aperture. The interior aperture is inaccessible from a top side, a first lateral side, and a second lateral side of the rail assembly. A first external channel is defined by the first lateral side of the rail assembly. The carriage power conductor is received within the first external channel. A second external channel is defined by the second lateral side of the rail assembly. A carriage data conductor is received within the second external channel. A first interior channel is defined by the first lateral side of the rail assembly. A tractor power conductor is received within the first interior channel. A second interior channel is defined by the second lateral side of the rail assembly. The first and second interior channels are each positioned within the interior aperture of the rail assembly. A tractor data conductor is received within the second interior channel. A tractor assembly movably couples with the rail assembly within the interior aperture.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 2:
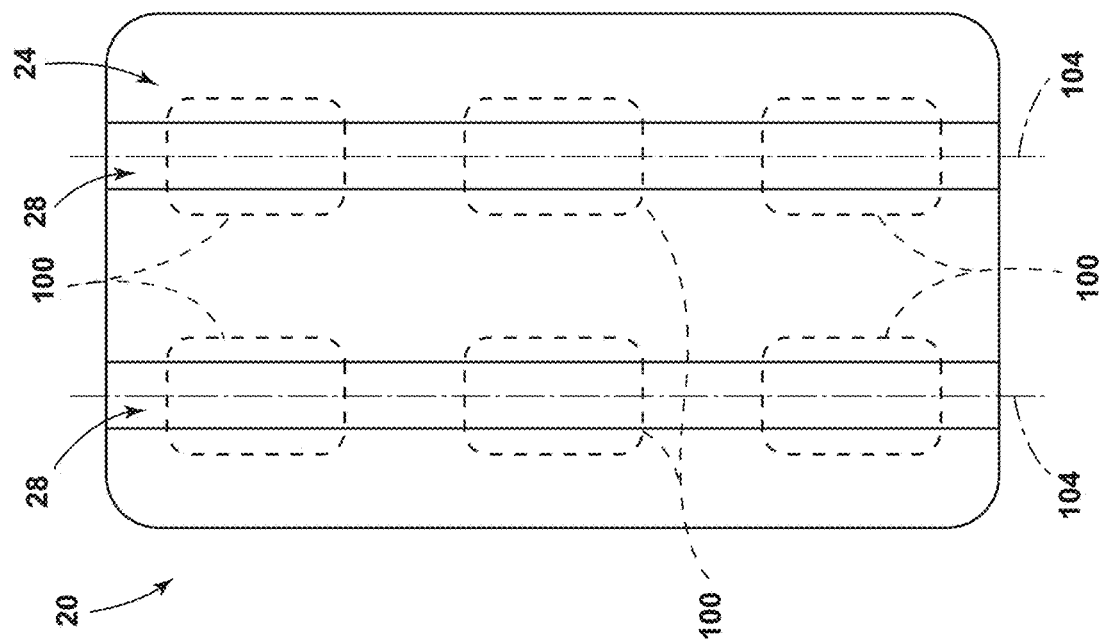
FIG. 2 is a top view of the cabin of the vehicle, illustrating track assemblies that the rail-mounted components couple to, according to one example.
Figure 1:
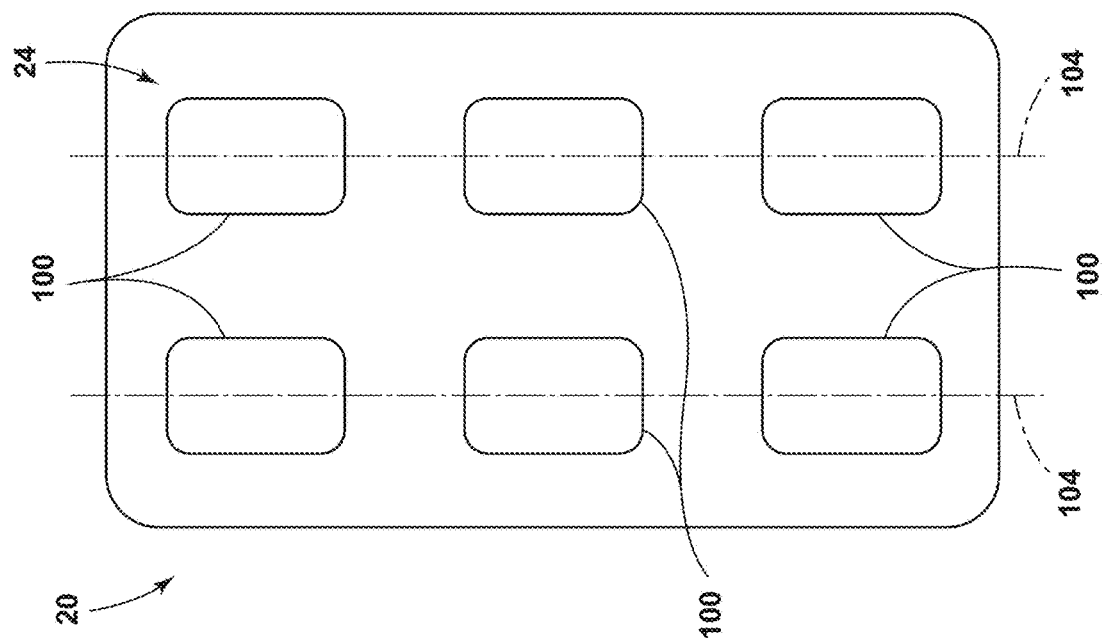
FIG. 1 is a top view of a cabin of a vehicle, illustrating rail-mounted components, according to one example.
Figure 3:
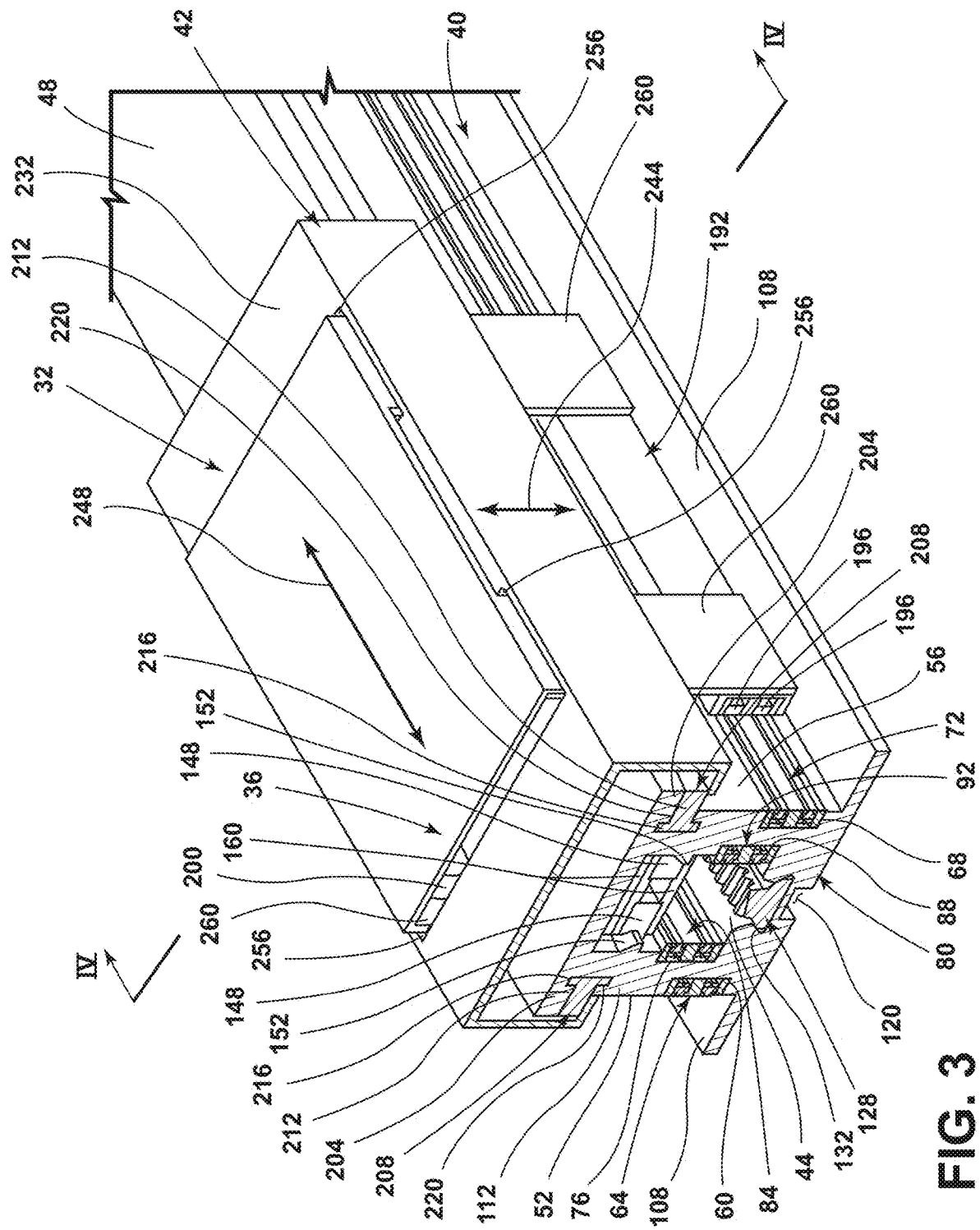
FIG. 3 is a side perspective view of the track assembly, illustrating various components of the track assembly, according to one example.
Figure 4:
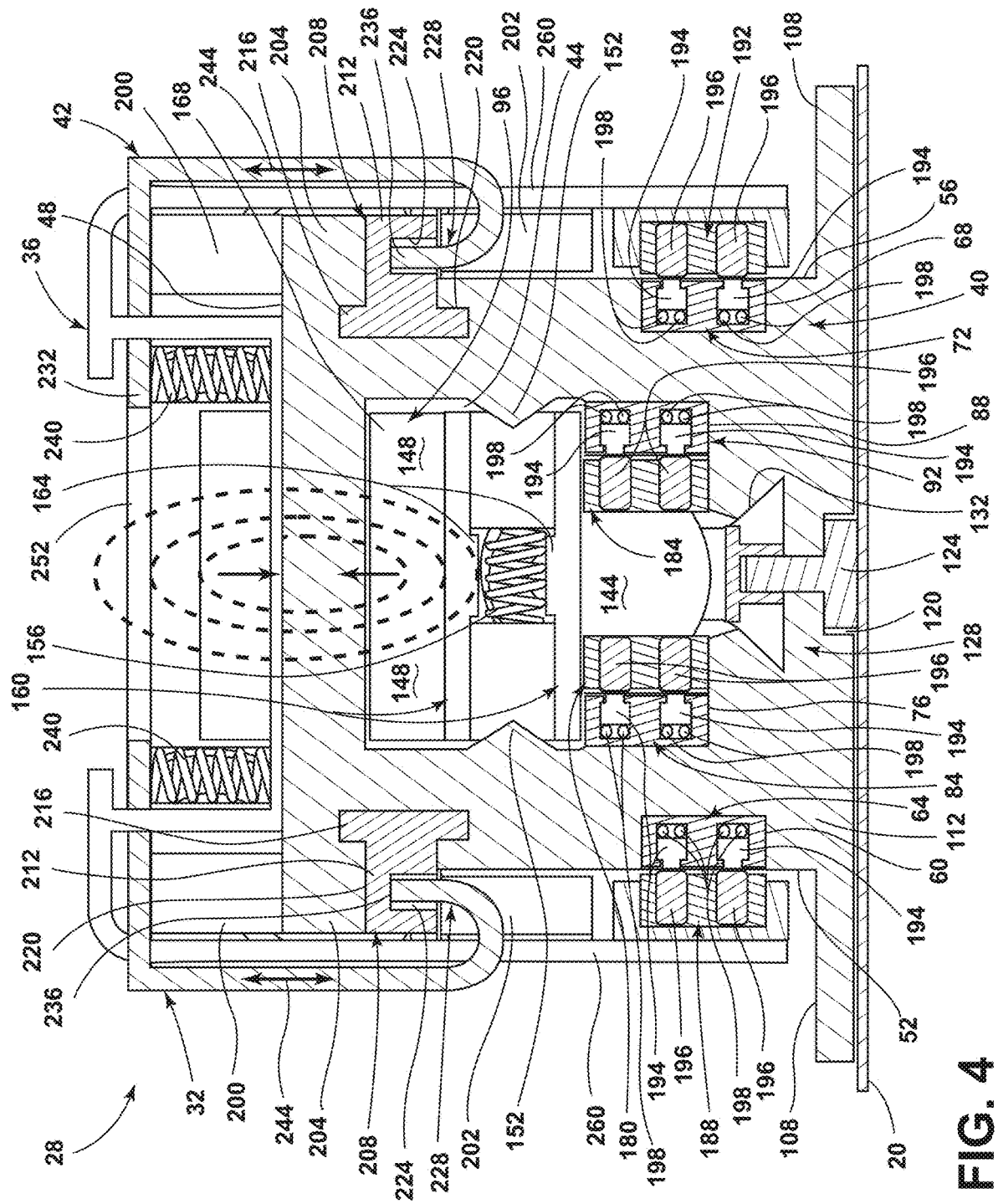
FIG. 4 is a cross-sectional view of the track assembly, taken along line IV-IV of FIG. 3, illustrating an engagement between a rail assembly, a carriage assembly, and a tractor assembly, according to one example.

For purposes of description herein, the terms "upper," "lower," "right," "left," "rear," "front," "vertical," "horizontal," and derivatives thereof shall relate to the concepts as oriented in FIGS. 3 and 4. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a track assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about" It will be further understood that the endpoints of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-12, reference numeral 20 generally designates a vehicle. The vehicle 20 includes a cabin 24. A track assembly 28 can be coupled to a portion of the cabin 24. In various examples, the track assembly 28 can include a retention structure 32, a carriage structure 36, and a rail assembly 40. The carriage structure 36 may extend through the retention structure 32. The rail assembly 40 can receive the retention structure 32 and the carriage structure 36 such that the retention structure 32 and the carriage structure 36 slidably couple with the rail assembly 40. The retention structure 32 and the carriage structure 36 can together define a carriage assembly 42. The rail assembly 40 defines an interior aperture 44. The interior aperture 44 may be inaccessible from a top side 48, a first lateral side 52, and a second lateral side 56 of the rail assembly 40. A first external channel 60 may be defined by the first lateral side 52 of the rail assembly 40. A carriage power conductor 64 can be received within the first external channel 60. A second external channel 68 may be defined by the second lateral side 56 of the rail assembly 40. A carriage data conductor 72 can be received within the second external channel 68. In various examples, a first interior channel 76 may be defined by the first lateral side 52 of the rail assembly 40. Alternatively, the first interior channel 76 may be defined by the top side 48 or a bottom side 80 of the rail assembly 40. In some examples, the first interior channel 76 may be angularly displaced relative to the top side 48, the first lateral side 52, the second lateral side 56, and/or the bottom side 80 (see FIGS. 8-9). Accordingly, it is contemplated that the first interior channel 76 may be defined by more than one of the top side 48, the first lateral side 52, the second lateral side 56, and the bottom side 80 of the rail assembly 40. A tractor power conductor 84 can be received within the first interior channel 76. In various examples, a second interior channel 88 may be defined by the second lateral side 56 of the rail assembly 40. As with the first interior channel 76, alternative examples may provide the second interior channel 88 as defined by the top side 48 or the bottom side 80 of the rail assembly 40. In some examples, the second interior channel 88 may be angularly displaced relative to the top side 48, the first lateral side 52, the second lateral side 56, and/or the bottom side 80 (see FIGS. 8-9). Accordingly, it is contemplated that the second interior channel 88 may be defined by more than one of the top side 48, the first lateral side 52, the second lateral side 56, and the bottom side 80 of the rail assembly 40. It is further contemplated that the first interior channel 76 and the second interior channel 88 may be defined by a single side (e.g., the top side 48, the first lateral side 52, the second lateral side 56, or the bottom side 80) of the rail assembly 40 without departing from the concepts disclosed herein. The first and second interior channels 76, 88 are each positioned within the interior aperture 44 of the rail assembly 40. A tractor data conductor 92 can be received within the second interior channel 88. A tractor assembly 96 can movably couple with the rail assembly 40 within the interior aperture 44.

Referring again to FIGS. 1 and 2, the vehicle 20 can be provided with a plurality of rail-mounted components 100. In examples, the rail-mounted components 100 may be, but are not limited to, seating assemblies, floor consoles, center consoles, storage units that include multiple storage compartments, and the like. In various examples, the rail-mounted component 100 can removably couple with the track assembly 28 and/or the rail assembly 40. For example, the rail-mounted component 100 can removably couple with the carriage structure 36 (FIG. 3) such that actuation of the carriage structure 36 along the rail assembly 40 results in corresponding actuation of the associated rail-mounted component 100. In some examples, the rail-mounted component(s) 100 can be coupled to more than one of the carriage structures 36 such that coordinated actuation of the plurality of carriage structures 36 results in corresponding actuation of the associated rail-mounted component(s) 100. The vehicle 20 can be provided with one or more of the track assemblies 28. The track assemblies 28 can be arranged along longitudinal, lateral, and/or angular (e.g., diagonal) directions within the cabin 24. In the depicted example, the track assemblies 28 are aligned in a longitudinal direction within the cabin 24 and the track assemblies 28 are arranged with centerlines 104 that are parallel to a longitudinal axis of the vehicle 20.

Referring now to FIGS. 3-9, the top side 48 and the bottom side 80 are positioned opposite one another on the rail assembly 40. Similarly, the first and second lateral sides 52, 56 are positioned opposite one another. While described and depicted as top and bottom sides 48, 80 relative to their orientation in FIGS. 3-9, the present disclosure is not so limited. The bottom side 80 may alternatively be referred to as a vehicle-mounting side. Said another way, the bottom side 80 can directly abut a portion of the vehicle 20 upon which the track assembly 28 is mounted. Accordingly, in examples where the track assembly 28 is mounted to a floor of the cabin 24 of the vehicle 20, the bottom side 80 can be oriented vertically below the top side 48. Similarly, in examples where the track assembly 28 is mounted to a ceiling or roof of the cabin 24 of the vehicle 20, the bottom side 80 can be oriented vertically above the top side 48 as the bottom side 80 is mounted to the vehicle 20. It is contemplated that the bottom side 80, or vehicle-mounting side, may be coupled to sides of the vehicle 20 rather than to the floor or the ceiling of the vehicle 20. Accordingly, in such examples, the top and bottom sides 48, 80 may be oriented as lateral sides. While these various orientations and arrangements of the track assembly 28 within the cabin 24 of the vehicle 20 are contemplated and in keeping with the concepts disclosed herein, for the sake of brevity and clarity, the track assembly 28 is primarily discussed with reference to the orientation of the track assembly 28 when the track assembly 28 is coupled to the floor of the cabin 24.

Referring again to FIGS. 3-9, the bottom side 80 can be provided with one or more flanges 108 that extend radially outward from a body 112 of the rail assembly 40. The flanges 108 can provide lateral stability to the rail assembly 40. For example, the flanges 108 can provide lateral stability to the rail assembly 40 when forces are applied to the rail assembly 40 (e.g., by the retention structure 32 and/or the carriage structure 36) during normal operation and/or in the event of an impact (e.g., vehicle-to-vehicle and/or cargo impacting a rail-mounted component 100). The flanges 108 can provide lateral stability in a direction that is angularly offset from the direction of travel along the rail assembly 40 (e.g., perpendicular to a direction of travel along the rail assembly 40). Additionally, in some examples, the flanges 108 can be utilized as a coupling portion that receives one or more fasteners 116 that secure the rail assembly 40 to the vehicle 20 (see FIGS. 6-7). In examples that do not utilize the flanges 108 for receiving fasteners 116 to secure the rail assembly 40 to the vehicle 20, the bottom side 80 of the rail assembly 40 can define a coupling slot 120. The coupling slot 120 can receive anchors 124 that retain the rail assembly 40 to a portion of the vehicle 20. Additionally or alternatively, the anchors 124 can retain a drive rack 128 to the rail assembly 40. Accordingly, the anchors 124 can extend through a portion of the bottom side 80 into the interior aperture 44 such that the anchors 124 can engage with the drive rack 128 (e.g., threadably engage) and ultimately retain the drive rack 128 in a desired position within the interior aperture 44. The bottom side 80 can define a drive rack receiving slot 132 that receives the drive rack 128. In various examples, the drive rack receiving slot 132 can have a tapered cross-section such that an interference fit is provided with the drive rack 128. For example, the drive rack receiving slot 132 may have a generally pyramidal cross-section that is complementary to a cross-section of the drive rack 128 such that, upon inserting the drive rack 128 into the drive rack receiving slot 132, the drive rack 128 is retained in a vertical direction and/or a horizontal direction that is non-parallel with a direction of travel along the rail assembly 40 (e.g., left-to-right as oriented in FIGS. 3-9). Such retention of the drive rack 128 in vertical and/or horizontal directions that are non-parallel with the direction of travel along the rail assembly 40 may be accomplished in the absence of the anchors 124. In some examples, the anchors 124 can retain the drive rack 128 in a desired position in a horizontal direction that is parallel or substantially parallel to the direction of travel along the rail assembly 40, even if the anchors 124 do not threadably engage with the drive rack 128. The anchors 124 can engage with an underside of the drive rack 128. The underside of the drive rack 128 can be defined as a side that is opposite teeth 140 of the drive rack 128.

Referring further to FIGS. 3-8, the teeth 140 of the drive rack 128 can be engaged by the tractor assembly 96 such that the tractor assembly 96 can move along the drive rack 128 and ultimately traverse the length of the rail assembly 40. For example, a worm gear 144 can engage with the teeth 140 on the drive rack 128 such that rotation in a first rotational direction (e.g., clockwise) results in the tractor assembly 96 actuating, or climbing, in a first linear direction (e.g., forward); and rotation in a second rotational direction (e.g., counterclockwise) results in the tractor assembly 96 actuating, or climbing, in a second linear direction (e.g., rearward). In various examples, the tractor assembly 96 can be provided with one or more guide members 148 that can engage with a portion of the rail assembly 40 within the interior aperture 44 such that the tractor assembly 96 maintains a desired positioning within the interior aperture 44. Accordingly, binding, sticking, and/or rattling of components of the track assembly 28 can be reduced in frequency of occurrence and/or severity. The guide members 148 can aid in vertical and/or horizontal positioning of the tractor assembly 96 within the interior aperture 44. The guide members 148 can also decrease a level of felt friction that the tractor assembly 96 may experience as the tractor assembly 96 traverses the rail assembly 40. The decreased level of felt friction by the tractor assembly 96 as a result of the guide members 148 being made of a low friction and/or self-lubricating material (e.g., ultra-high molecular weight polyethylene). The guide members 148 can engage with protruding features 152 of the rail assembly 40 that extend inwardly from the sides of the rail assembly 40 into the interior aperture 44. For example, the protruding features 152 can extend inwardly from the first and second lateral sides 52, 56 toward the interior aperture 44. The engagement between the guide members 148 and the protruding features 152 can facilitate and/or aid in retaining a horizontal and/or vertical position of the tractor assembly 96 within the interior aperture 44.

Referring still further to FIGS. 3-9, in examples that utilize more than one guide member 148, a guide member biasing member 156 can be provided that allows the guide members 148 to move between extended and retracted positions. For example, the guide member biasing member 156 can bias the guide members 148 to an extended position such that the guide members 148 are actively pressed into engagement with the protruding features 152. In various examples, the guide member biasing member 156 can be a compression spring, a coil spring, a leaf spring, elastomeric tubing, polymeric tubing, rubber tubing, or any other suitable structure or feature that biases the guide members 148 to an extended position. Movement of the guide members 148 can be constrained by adjacent portions of a tractor frame 160 positioned generally parallel to one another and extending along an extension axis of the guide members 148. As depicted, the extension axis may be a horizontal axis. The tractor frame 160 in the region of the guide members 148 can define one or more guide member shoulders 164. The guide member shoulders 164 can extend inwardly toward the guide members 148 and be positioned between the guide members 148. The guide member shoulders 164 can provide an innermost stop for the retracted position of the guide members 148. Additionally or alternatively, the guide member shoulders 164 can provide a region of narrower inner diameter that can aid in retention of the guide member biasing member 156 while also aiding in guiding compression and/or extension of the guide member biasing member 156.

Referring yet again to FIGS. 3-9, the tractor assembly 96 can be provided with one or more electromagnets 168. At least one of the electromagnets 168 is provided with electrical leads 172 that can receive power from a power supply, such as a vehicle battery. Accordingly, the electromagnet(s) 168 can be selectively energized to introduce a magnetic field when desired. The introduction of the magnetic field can be utilized to disengage or unlock the retention structure 32 and transmit motion of the tractor assembly 96 to the retention structure 32 and/or carriage structure 36, as will be discussed in more detail below. The power received by the electromagnet(s) 168 can be transmitted from the power supply by the tractor power conductor 84. The tractor power conductor 84 can also provide power from the power supply to run a drive motor 176 (see FIG. 12) that drives the worm gear 144 to rotate. One or more tractor power brush assemblies 180 can engage with the tractor power conductor 84. The vehicle 20 and the tractor assembly 96 can exchange data and/or information by way of the tractor data conductor 92. The tractor assembly 96 includes tractor data brush assemblies 184 that engage with the tractor data conductor 92. The data and/or information that the vehicle 20 and the tractor assembly 96 exchange can include, but is not limited to, positional information about a present location of the tractor assembly 96 within the rail assembly 40, instructions about a desired location of the tractor assembly 96 within the rail assembly 40 for the tractor assembly 96 to move to, instructions about a number and direction of rotations of the worm gear 144 to achieve the desired location from the present location, instructions about engaging and/or disengaging the electromagnet(s) 168, a status or health of the tractor assembly 96 (e.g., are components of the tractor assembly 96 operating as expected and/or intended), a coupled or decoupled state of the tractor assembly 96 with a rail-mounted component 100, and/or whether the retention structure 32 has been successfully placed in the engaged or disengaged position. Accordingly, the vehicle 20 can relay information about the interaction of various components of the track assembly 28 to other components of the track assembly 28 and/or other components of the vehicle 20. Therefore, improved integration of components of the vehicle 20 can be achieved while providing improved monitoring of the components of the vehicle 20. The tractor power and data brush assemblies 180, 184 will be discussed in more detail below.

Referring further to FIGS. 3-9, the carriage structure 36 can be provided with one or more carriage power brush assemblies 188 and/or one or more carriage data brush assemblies 192. The carriage power brush assembly 188 engages with the carriage power conductor 64 such that rail-mounted components 100 that are coupled to the carriage structure 36 can receive power from the power supply. In examples where the rail-mounted component 100 is a seating assembly, the power received from the power supply by the carriage power brush assembly 188 can transmit power to seat-mounted components that can include, but are not limited to, safety devices, safety restraints, seat-mounted airbags, occupancy status sensors/indicators, comfort components, seat heating components, seat ventilation components, seat articulation motors (e.g., seat back reclining, extension of lower leg support, adjustment of side bolsters, adjustment of headrest position, swivel of seating assembly relative to vehicle 20, and/or armrest deployment/stowage), charging stations for electronic devices, and/or seat-mounted entertainment solutions (e.g., audio and/or visual entertainment). In examples where the rail-mounted components 100 are consoles (e.g., floor consoles or center consoles), the power received from the power supply by the carriage power brush assembly 188 can transmit power to console components. The console components that receive power can include, but are not limited to, light sources (e.g., incandescent bulbs and/or LEDs), compartment locks, thermal management systems (e.g., for cup holders and/or storage compartments), charging stations for electronic devices, and/or actuation motors (e.g., for storage compartment lids/covers). In examples where the rail-mounted components 100 are storage units or rows of lockers, the power received from the power supply by the carriage power brush assembly 188 can transmit power to storage unit components. The storage unit components can include, but are not limited to, light sources (e.g., incandescent bulbs or LEDs), locks for individual storage compartments of the storage units, thermal management systems (e.g., temperature controlled storage compartments for transport of perishable foods and/or transport of delivered hot foods), charging stations for electronic devices, stored item sensors/indicators (e.g., weight sensors, optical sensors, cameras, and/or photoelectric sensors), and/or actuation motors for doors on individual storage compartments.

Referring still further to FIGS. 3-9, the carriage data brush assembly 192 engages with the carriage data conductor 72 such that the rail-mounted components 100 and the vehicle 20 can communicate status, health, and/or instructions to one another. In examples where the rail-mounted components 100 are seating assemblies, the data communicated between the carriage data conductor 72 and the carriage data brush assembly 192 can include, but is not limited to, position along the rail assembly 40, rotational position of actuation motors, rotational position of seat components relative to one another (e.g., seat back, seat, lower leg support, headrest, armrests, and/or side bolsters), a swivel rotational position relative to the vehicle 20, health of the actuation motors (e.g., presence of binding, sticking, or other departures from expected/intended operation), occupancy status, on/off state of seat-mounted components (e.g., heating, ventilation, actuation motors, and/or entertainment solutions), engaged vs. disengaged state of safety restraints (e.g., buckled vs. unbuckled), health of safety devices, and/or health of seat-mounted airbags. In examples where the rail-mounted components 100 are consoles (e.g., floor consoles or center consoles), the data communicated between the carriage data conductor 72 and the carriage data brush assembly 192 can include, but is not limited to, position along the rail assembly, open vs. closed status of lids or covers to storage compartments, on/off status of light sources, locked vs. unlocked status of compartment locks, on/off status of thermal management systems, thermal status of thermal management systems (e.g., providing heated vs. cooled environment), and/or utilization state of charging stations (e.g., electronic device connected vs. no electronic device connected). In examples where the rail-mounted components 100 are storage units or rows of lockers, the data communicated between the carriage data conductor 72 and the carriage data brush assembly 188 can include, but is not limited to, on/off status of light sources, locked vs. unlocked status for individual storage compartments, on/off status of thermal management systems, thermal status of thermal management systems (e.g., providing heated vs. cooled environment), utilization state of charging stations (e.g., electronic device connected vs. no electronic device connected), and/or item stored vs. empty status of a given storage compartment.

Referring further to FIGS. 3-9, the carriage power conductor 64, the carriage data conductor 72, the tractor power conductor 84, and the tractor data conductor 92 are each provided with conductive members 194. The conductive members 194 are engaged by corresponding brushes 196 in each of the brush assemblies. For example, the conductive members 194 in the carriage power conductor 64 are engaged by brushes 196 in the carriage power brush assemblies 188, the conductive members 194 in the carriage data conductors 72 are engaged by brushes 196 in the carriage data brush assemblies 192, the conductive members 194 in the tractor power conductors 84 are engaged by brushes 196 in the tractor power brush assemblies 180, and the conductive members 194 in the tractor data conductors 92 are engaged by brushes 196 in the tractor data brush assemblies 184. In some examples, such as those depicted in FIGS. 4, 5, 8, and 9, a biasing member 198 can be provided that biases one or more of the conductive members 194 to an extended position. Additionally or alternatively, the biasing member 198 can be provided such that one or more of the brushes 196 is biased to an extended position. For example, see FIG. 6 where the biasing members 198 are provided behind one or more of the brushes 196 such that the associated brushes 196 are biased to the extended position while the biasing members 198 are omitted from the conductive members 194; as well as FIG. 9 where the biasing members 198 are provided behind one or more of the conductive members 194 and one or more of the brushes 196. Accordingly, active engagement between the conductive members 194 and the brushes 196 can be maintained such that power and/or data may be transferred between the vehicle 20 and the carriage assembly 42 by way of the rail assembly 40.

Referring again to FIGS. 3-9, the carriage structure 36 can be provided with upper rollers 200 and/or lower rollers 202. The upper and lower rollers 200, 202 cooperate to retain a vertical position of the carriage structure 36 relative to the rail assembly 40. While the upper and lower rollers 200, 202 are described as retaining a vertical position of the carriage structure relative to the rail assembly 40, the present disclosure is not so limited. Rather, the upper and lower rollers 200, 202 can more broadly be described as retaining the carriage structure 36 to the rail assembly 40 in a direction that is non-parallel with the direction of travel along the rail assembly 40. Accordingly, the upper and lower rollers 200, 202 retain the carriage structure 36 to the rail assembly 40 while allowing for actuation along the rail assembly 40 to occur. The upper rollers 200 slidably engage with a surface of the top side 48 of the rail assembly 40. The lower rollers 202 can slidably engage with surfaces that are defined by the first lateral side 52, the second lateral side 56, and/or the top side 48. For example, the lower rollers 202 can slidably engage with an underside of rail shoulders 204 that are defined by the rail assembly 40. The rail shoulders 204 can be defined by a difference in a distance between exterior surfaces of the first and second lateral sides 52, 56 and an overall width of the top side 48. The upper and lower rollers 200, 202 can be, but are not limited to, wheels, bearings, and/or glide bars (e.g., low friction non-rotating structures). In various examples, the lower rollers 202 can engage with a component that is inserted or otherwise provided in or proximate to the rail shoulders 204. For example, the lower rollers 202 can slidably engage with a locking rail 208.

Referring further to FIGS. 3-9, the locking rail 208 can be T-shaped with a leg 212 and a cross-member 216. The locking rail 208 can be received within a locking rail channel 220 that is defined by the rail assembly 40. For example, the locking rail channel 220 can be defined by one or more of the top side 48, the first lateral side 52, and the second lateral side 56. The locking rail channel 220 is complementarily shaped to receive the locking rail 208. Accordingly, the cross-member 216 can provide lateral retention forces to retain the locking rail 208 within the locking rail channel 220 during normal operation. In various examples, the leg 212 of the locking rail 208 can define recesses 224 that receive a portion of the retention structure 32. The retention structure 32 can be provided with locking pawls 228 that engage with the recesses 224. The locking pawls 228 can extend downwardly from an upper portion 232 of the retention structure 32 toward the rail assembly 40. The locking pawls 228 include an engagement end 236 that engages with the recesses 224 in the locking rail 208. In various examples, the engagement ends 236 can be arcuate in shape such that the engagement ends 236 engage with an underside of the locking rail 208. The underside of the locking rail 208 can define the recesses 224 that receive the engagement ends 236 of the locking pawls 228. In some examples, the locking pawls 228 may aid in retention of the carriage structure 36 such that the lower rollers 202 may be omitted.

Figure 5:
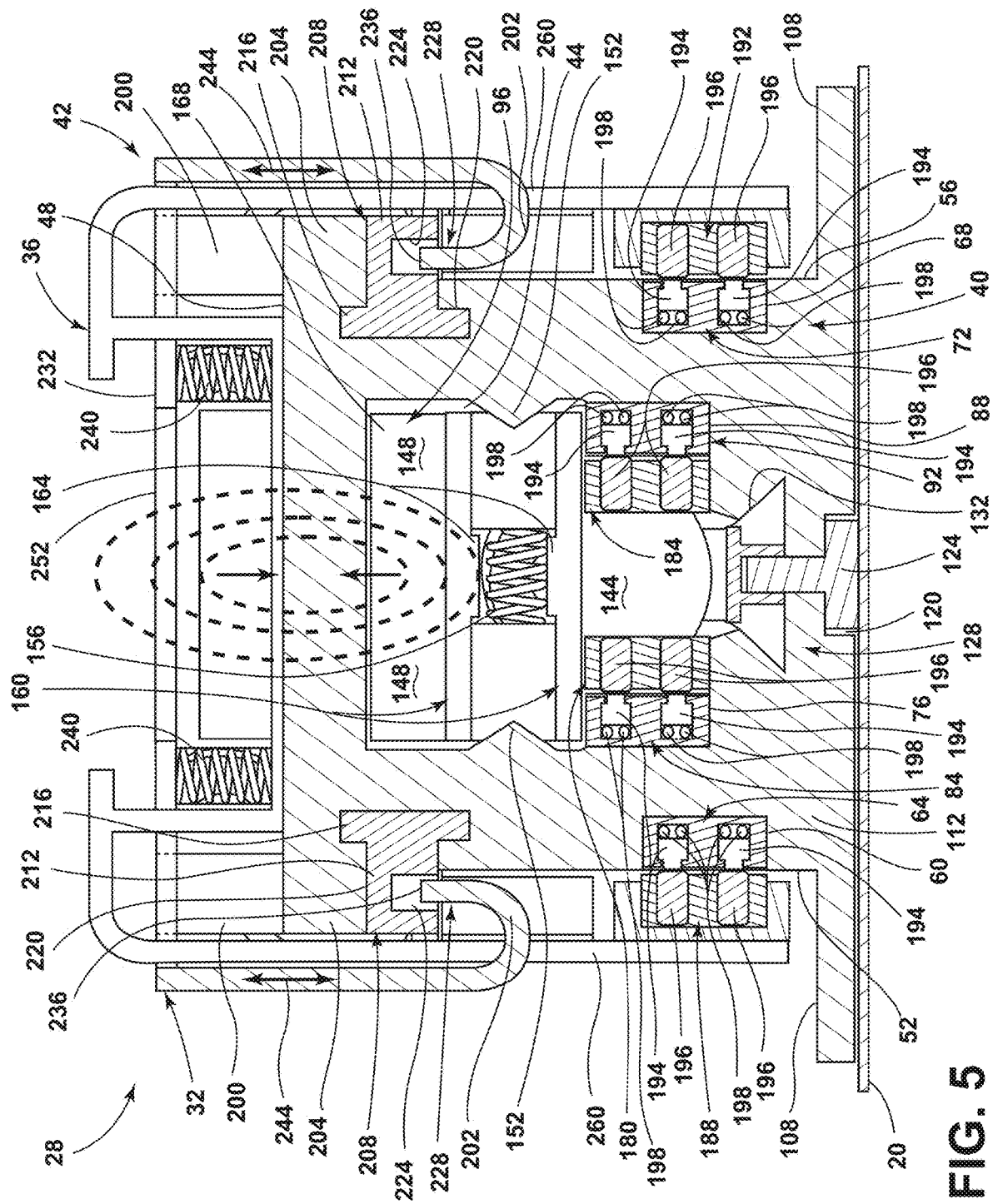
FIG. 5 is a cross-sectional view of the track assembly, taken along line IV-IV of FIG. 3, illustrating a retention structure in an at least partially-lowered position, according to one example.
Figure 6:
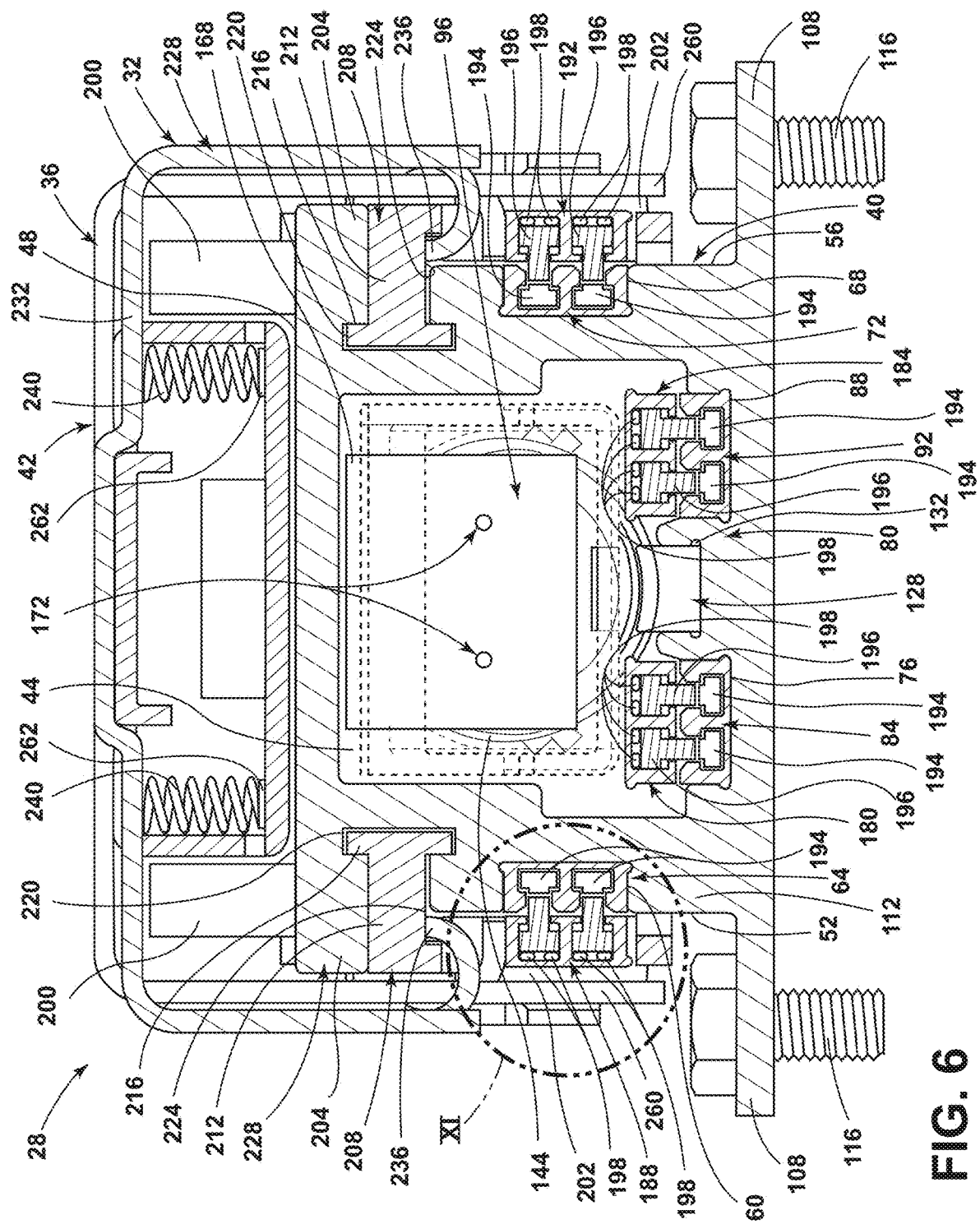
FIG. 6 is a cross-sectional view of the track assembly, taken along line IV-IV of FIG. 3, illustrating the engagement between the rail assembly, the carriage assembly, and the tractor assembly, according to another example.
Figure 7:
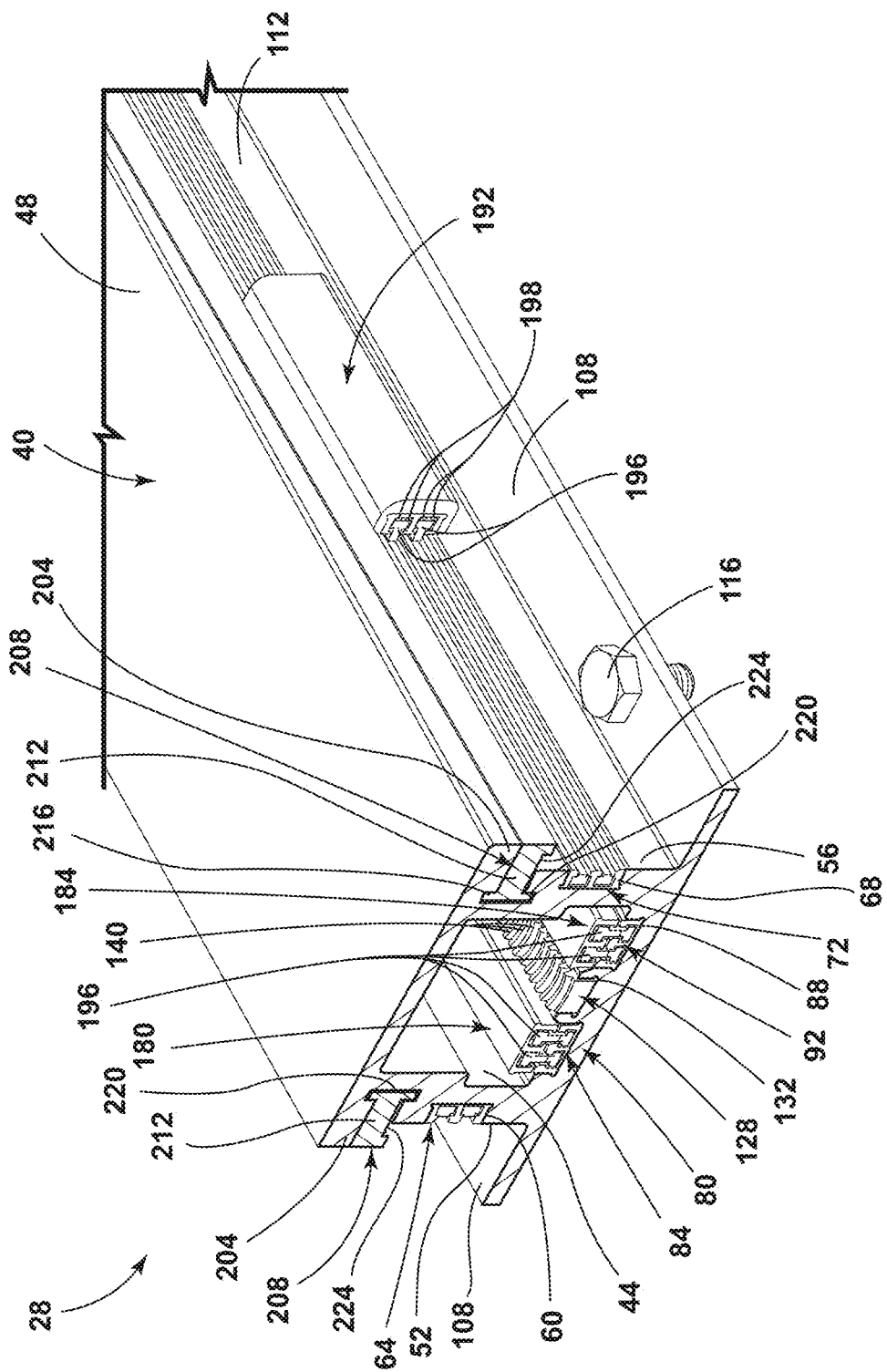
FIG. 7 is a side perspective view of the rail assembly, illustrating an engagement between a carriage data conductor and a carriage data brush assembly, an engagement between a tractor power conductor and a tractor power brush assembly, and an engagement between a tractor data conductor and a tractor data brush assembly, according to one example.
Figure 8:
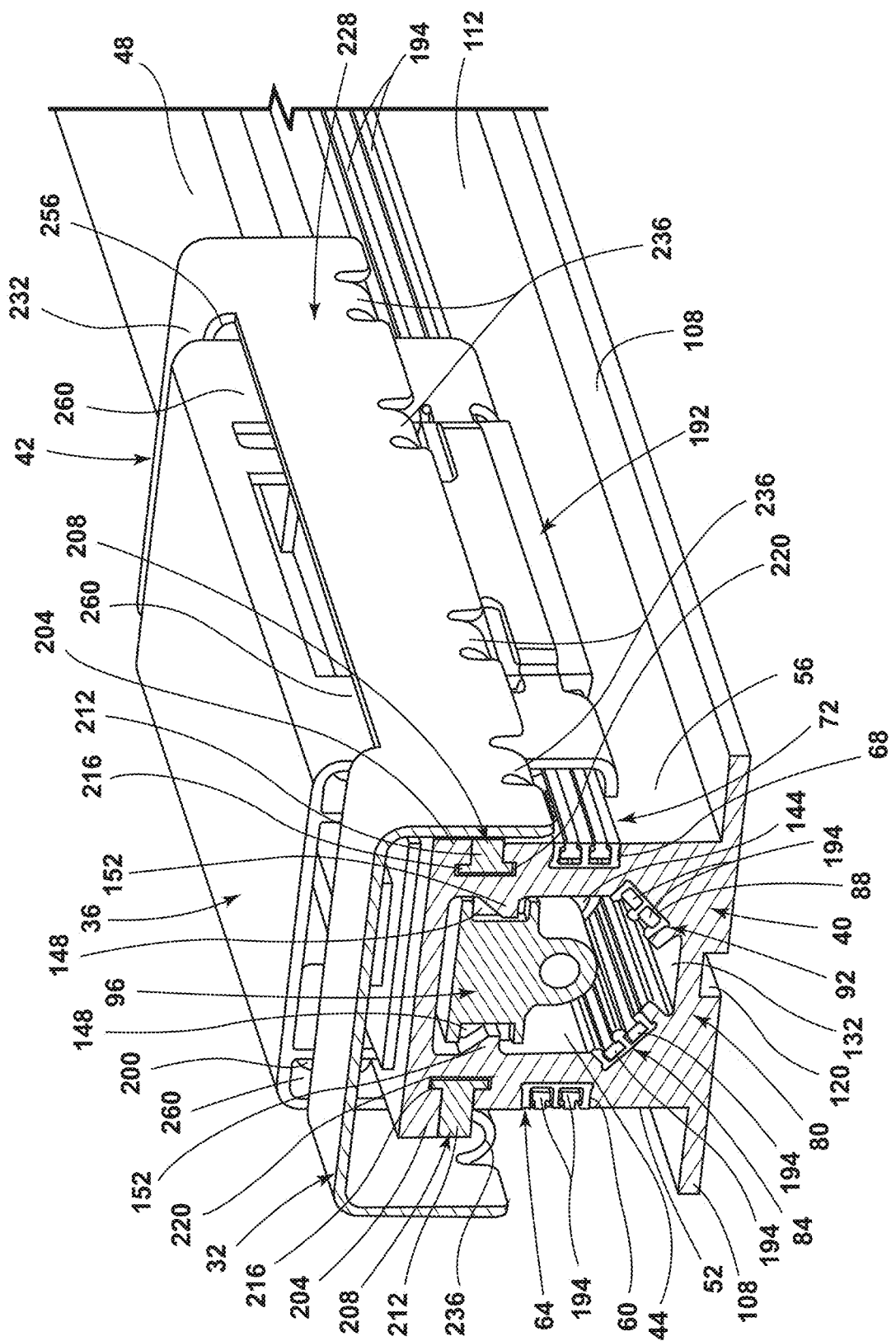
FIG. 8 is a side perspective view of the track assembly, illustrating various components of the track assembly, according to another example.
Figure 9:
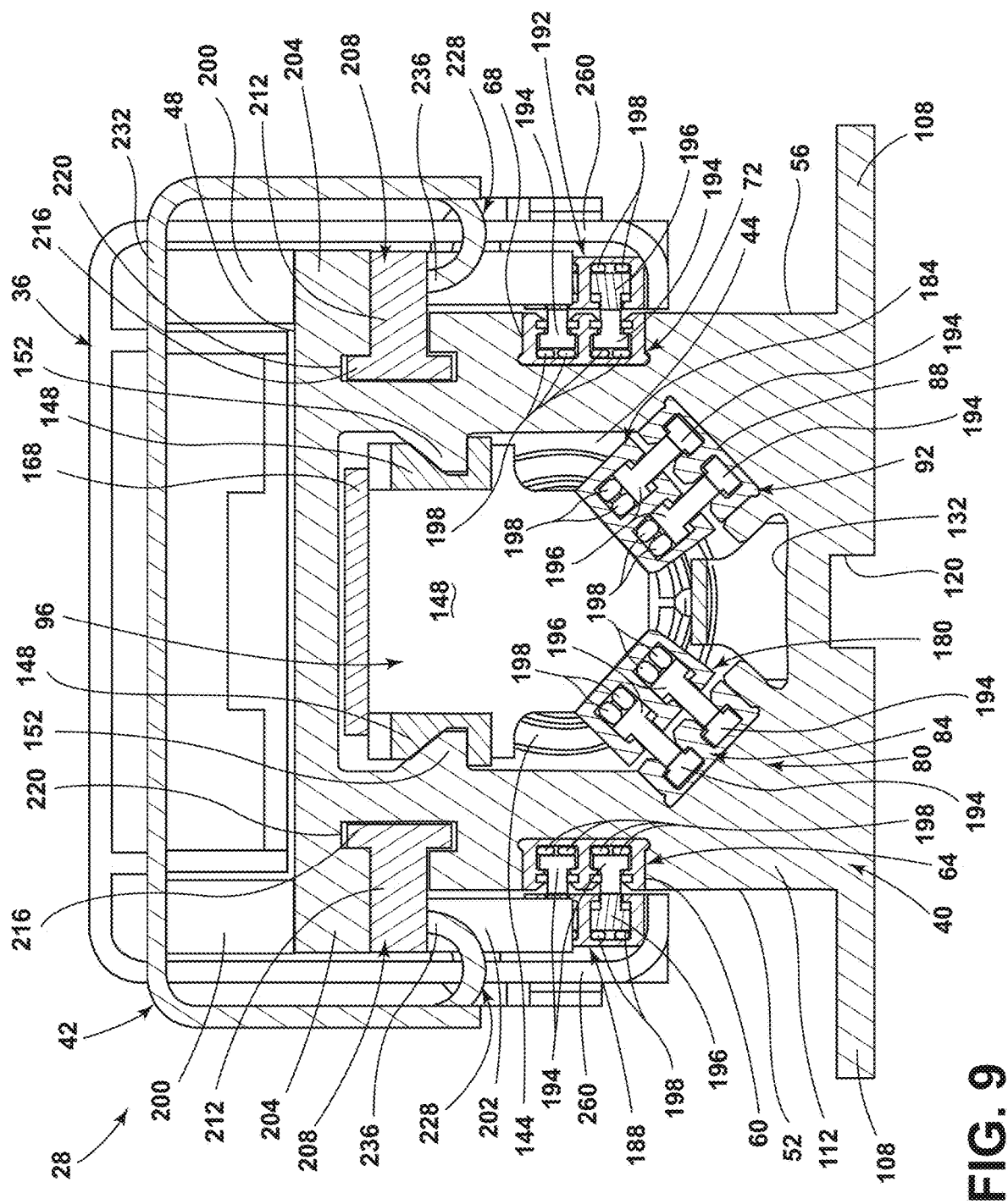
FIG. 9 is an end-on or front view of the track assembly, illustrating the engagement between various components of the track assembly, according to one example.
Figure 10:
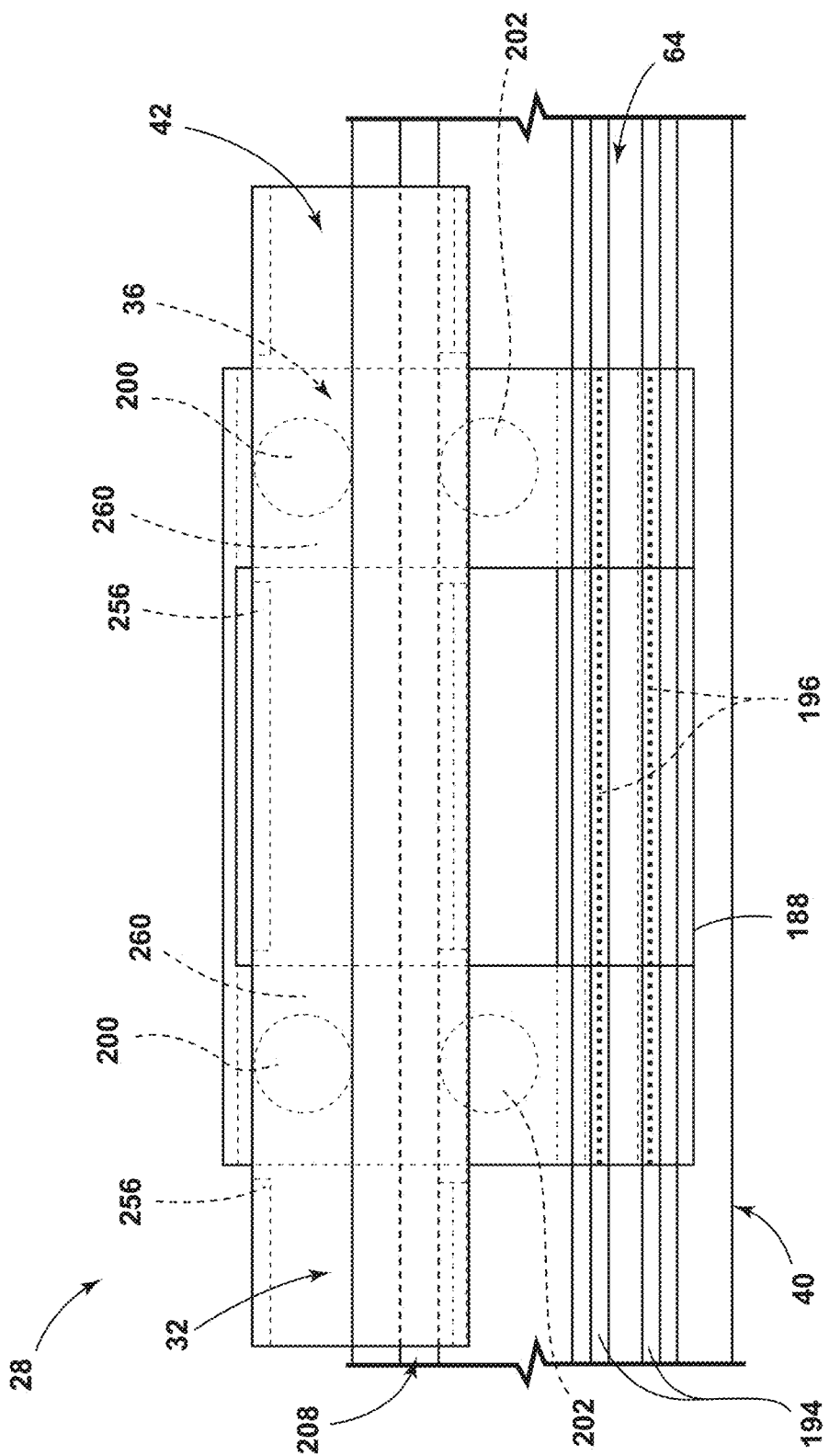
FIG. 10 is a side view of the track assembly, illustrating a carriage structure passing through the retention structure, according to one example.

Referring yet again to FIGS. 3-9, the retention structure 32 is operable between raised and lowered positions. The raised position, in one example, is depicted in FIG. 4. An at least partially-lowered position, in one example, is depicted in FIG. 5. In some examples, the engagement end 236 of the locking pawl 228 does not fully exit a depth of the recess 224 in the locking rail 208 prior to movement of the retention structure 32 and the carriage structure 36 along the rail assembly 40. In such an example, the recesses 224 in the locking rail 208 may be interconnected with adjacent others of the recesses 224 by a groove that extends along the locking rail 208, where the groove has a depth that is shallower or less than the depth of the recesses 224. Accordingly, the locking rail 208 may permit actuation along the rail assembly 40 while preventing unintentional decoupling of the retention structure 32 from the rail assembly 40 in directions that are non-parallel to the direction of actuation of the carriage assembly 42 along the rail assembly 40. In other examples, the engagement end 236 of the locking pawl 228 fully exits the recess 224 in the locking rail 208 prior to movement of the retention structure 32 and the carriage structure 36 along the rail assembly 40. In either example, regardless of whether the engagement end 236 fully exits the recess 224 prior to actuation of the retention structure 32 and the carriage structure 36, the dimensions and/or materials of the retention structure 32, the carriage structure 36, and/or the rail assembly 40 can prevent unintentional decoupling of the retention structure 32 from the rail assembly 40. For example, in the event that the engagement end 236 fully exits the recess 224 prior to actuation along the rail assembly 40, the size and positioning of the retention structure 32 relative to the rail assembly 40 can prevent unintentional decoupling by the engagement ends 236 contacting the first or second lateral sides 52, 56 depending on the direction of an external force. Accordingly, the retention structure 32 can be prevented from unintentional decoupling from the rail assembly 40. The same fit and prevention of unintentional decoupling can also be provided in examples where the engagement ends 236 do not fully exit the depth of the recesses 224 prior to actuation along the rail assembly 40.

Referring still further to FIGS. 3-9, the electromagnet 168 can induce motion of the retention structure 32 such that the retention structure 32 is moved between the raised and lowered positions. The movement induced by the electromagnet 168 of the tractor assembly 96 is indirect. That is, no direct physical contact is made between the tractor assembly 96, the electromagnet 168, and the retention structure 32. Additionally, no intermediate physical contact is made between the retention structure 32, the tractor assembly 96, and the electromagnet 168 by way of an intermediate portion of the track assembly 28, such as a cam or connecting member. Rather, the motion of the retention structure 32 induced by the electromagnet 168 to move the retention structure 32 from the raised to the lowered position is accomplished by a magnetic field selectively provided by the electromagnet 168. In operation, the tractor assembly 96 is actuated to a location along the rail assembly 40 where one of the carriage assemblies 42 is located. When the electromagnet 168 is activated, the magnetic field provided by the electromagnet 168 can cause the retention structure 32 to move the engagement ends 236 of the locking pawls 228 to the lowered or disengaged position relative to the recesses 224 such that the carriage assembly 42 can be actuated along the rail assembly 40. For example, the magnetic force provided by the electromagnet 168 can act against biasing members, such as lock springs 240, which bias the retention structure 32 to the raised or engaged position with the recesses 224. In various examples, the retention structure 32 can be made of a magnetically-susceptible material (e.g., steel) such that the magnetic field provided by the electromagnet 168 can attract the retention structure 32 toward the tractor assembly 96 and effect the disengagement of the engagement ends 236 from the recesses 224. The movement of the retention structure 32 between the raised and lowered positions is noted with arrow 244. Actuation of the retention structure 32 to the lowered or disengaged position permits actuation of the carriage assembly 42 along the rail assembly 40, as denoted with arrow 248. In some examples, the retention structure 32 may be made from a material that is not susceptible to a magnetic field. In such an example, the retention structure 32 can be provided with an insert 252 or a portion that is susceptible to magnetic fields. Accordingly, the electromagnet 168 can actuate the retention structure 32 by way of the insert 252 or magnetically susceptible portion.

Referring again to FIGS. 3-9, the carriage structure 36 can be at least partially made from a magnetically susceptible material (e.g., steel) or provided with an insert that is magnetically susceptible, similar to the example outlined above for the retention structure 32. When the electromagnet 168 is engaged below the carriage assembly 42, the carriage structure 36 can be indirectly coupled to the tractor assembly 96 that carries the engaged electromagnet 168. However, the carriage structure 36 does not vertically actuate relative to the rail assembly 40 due to the support provided by the upper rollers 200. Of course, it is contemplated that some degree of vertical movement of the carriage structure 36 may occur due to the activation of the electromagnet 168, however, this minor vertical movement can be restricted to the clearances provided between components of the carriage assembly 42. It is also contemplated that in many situations, the rail-mounted components 100 may have a sufficient amount of weight to result in the taking-up of tolerances between components of the carriage assembly 42 prior to, and independent of, activation of the electromagnet 168. While little to no vertical movement of the carriage structure 36 relative to the rail assembly 40 may occur as a result of the activation of the electromagnet 168, once the electromagnet 168 is activated and the magnetic field interacts with the carriage structure 36, then subsequent movement or actuation of the tractor assembly 96 relative to the rail assembly 40 is imparted to the carriage structure 36 and ultimately results in the actuation of the carriage assembly 42 along the rail assembly 40, as indicated by arrow 248.

Referring yet again to FIGS. 3-9, a method of coupling the carriage assembly 42 and the tractor assembly 96 to the rail assembly 40 will now be described according to one example. The carriage assembly 42 is aligned with an end of the rail assembly 40 such that the rail assembly 40 is generally collinear with a space between the carriage power brush assembly 188 and the carriage data brush assembly 192, as well as a space between the locking pawls 228 of the retention structure 32. In some examples, a portion of the locking rail 208 that is proximate a loading end of the rail assembly 40 can provide the recesses 224 as a continuous groove of the same or similar depth as the recesses 224 such that coupling of the carriage assembly 42 can be accomplished without compressing the lock springs 240. In such an example, the carriage assembly 42 can be coupled to the rail assembly 40 prior to the coupling of the tractor assembly 96 to the rail assembly 40 and without the exertion of additional energy by an assembler or by equipment used to compress the lock springs 240. Alternatively, during assembly, a magnetic field can be applied as the carriage assembly 42 is being coupled to the rail assembly 40 such that the retention structure 32 compresses the lock springs 240 and the carriage assembly 42 is free to slide along the rail assembly 40. The magnetic field in such an example may be provided by the tractor assembly 96 or by a piece of equipment utilized by the assembler. For example, an electromagnet that is separate from the tractor assembly 96 can be placed within the interior aperture 44 at the loading end of the rail assembly 40 and as the carriage assembly 42 is being aligned with the rail assembly 40, the electromagnet that is separate from the tractor assembly 96 can be utilized to compress the lock springs 240. It is also contemplated that the loading end of the rail assembly 40 can omit the locking rail 208 such that the engagement ends 236 of the locking pawls 228 slide within the locking rail channel 220 while the lock springs 240 remain in an extend position that corresponds with the raised position of the retention structure 32. Once the carriage assembly 42 has been assembled to the rail assembly 40, the tractor assembly 96 can be utilized to move the carriage assembly 42 along the rail assembly 40 to a desired location. Coupling the tractor assembly 96 to the rail assembly 40 can be done by aligning the tractor assembly 96 with the interior aperture 44 and compressing the guide member biasing member 156 such that the guide members 148 fit within the dimensions of the interior aperture 44. Next, the tractor assembly 96 can be inserted into the interior aperture 44 and ultimately engaged with the drive rack 128. In some examples, the protruding features 152 within the interior aperture 44 can taper toward the loading end of the rail assembly 40 such that the guide member biasing member 156 need not be compressed prior to inserting the tractor assembly 96 into the interior aperture 44. In such an example, as the tractor assembly 96 is actuated along the drive rack 128 along the rail assembly 40, the protruding features 152 can taper inward such that the guide members 148 are actuated toward one another and the guide member biasing member 156 is compressed.

Referring further to FIGS. 3-9, a method of operating the track assembly 28 will now be described according to one example. Once the tractor assembly 96 has been coupled to the rail assembly 40, the tractor assembly 96 can be utilized to adjust the position of one or more carriage assemblies 42 along the rail assembly 40. Once one of the carriage assemblies 42 has been coupled to the rail assembly 40, the tractor assembly 96 can be positioned below the carriage assembly 42 and the electromagnet(s) 168 can be engaged. The engagement of the electromagnet(s) 168 can transition the retention structure 32 from the raised position to the lowered position such that the engagement ends 236 disengage from the recesses 224 to an extent that permits actuation of the carriage assembly 42 along the rail assembly 40. The engagement of the electromagnet(s) 168 can also result in a magnetic coupling between the tractor assembly 96 and the carriage assembly 42 such that movement of the tractor assembly 96 along the rail assembly 40 results in corresponding movement of the carriage assembly 42 along the rail assembly 40. It is the magnetic coupling between the carriage assembly 42 and the tractor assembly 96 that enables the use of a slot-less approach to the rail assembly 40 while maintaining the ability to actuate rail-mounted components 100 to various locations within the cabin 24. The magnetic coupling also enables a contact-free actuation of the carriage assembly 42 along the rail assembly 40. The unlocking of the retention structure 32 and the magnetic coupling between the carriage assembly 42 and the tractor assembly 96 can occur simultaneously. Once the tractor assembly 96 has indirectly (e.g., magnetically) coupled with the carriage assembly 42, the tractor assembly 96 can actuate the carriage assembly 42 to the desired location along the rail assembly 40. Once the carriage assembly 42 has reached the desired location, the tractor assembly 96 can disengage the electromagnet(s) 168, which decouples the tractor assembly 96 from the carriage assembly 42 and allows the retention structure 32 to assume its raised or locked position with the engagement ends 236 entering one or more of the recesses 224. The tractor assembly 96 can then actuate to another location along the rail assembly 40 (e.g., back to the loading end) to similarly engage with another carriage assembly 42 to then actuate the next carriage assembly 42 to its associated desired location. Accordingly, each rail assembly 40 can be provided with a single tractor assembly 96 that is responsible for the adjustment of the positions of multiple carriage assemblies 42 coupled to the given rail assembly 40. In some examples, movement of the tractor assembly 96 in one rail assembly 40 can be synchronized with movement of the tractor assembly 96 in another rail assembly 40 to effect movement of rail-mounted components 100 that are coupled to a plurality of the rail assemblies 40 (e.g., storage units, lockers, consoles, seating assemblies, etc.).

Referring now to FIGS. 3-10, the carriage structure 36 can extend through the retention structure 32. For example, the retention structure 32 can define slots 256 that arms 260 of the carriage structure 36 extend through such that the carriage power and data brush assemblies 188, 192, which are carried by the arms 260, can engage with the carriage power conductor 64 and the carriage data conductor 72, respectively. Such an arrangement of the carriage assembly 42 enables continuous contact between the carriage power conductor 64 and the carriage power brush assembly 188, as well as the carriage data conductor 72 and the carriage data brush assembly 192, while permitting dynamic actuation of the retention structure 32 relative to the carriage structure 36. Additionally, the carriage structure 36 is able to provide a bearing surface for the retention structure 32 to act upon when the retention structure is actuated between the raised and lowered positions. The lock springs 240 can be positioned between a portion of the retention structure 32 and a portion of the carriage structure 36 such that the lock springs 240 are sandwiched between the two components. In some examples, the lock springs 240 may be positioned on or over a protrusion 262 that retains a lateral position of the lock springs 240 relative to the carriage assembly 42 as the lock springs 240 are actuated between compressed and extended positions. The protrusions 262 can be sized to fit within an inner diameter of the lock springs 240.

Figure 11:
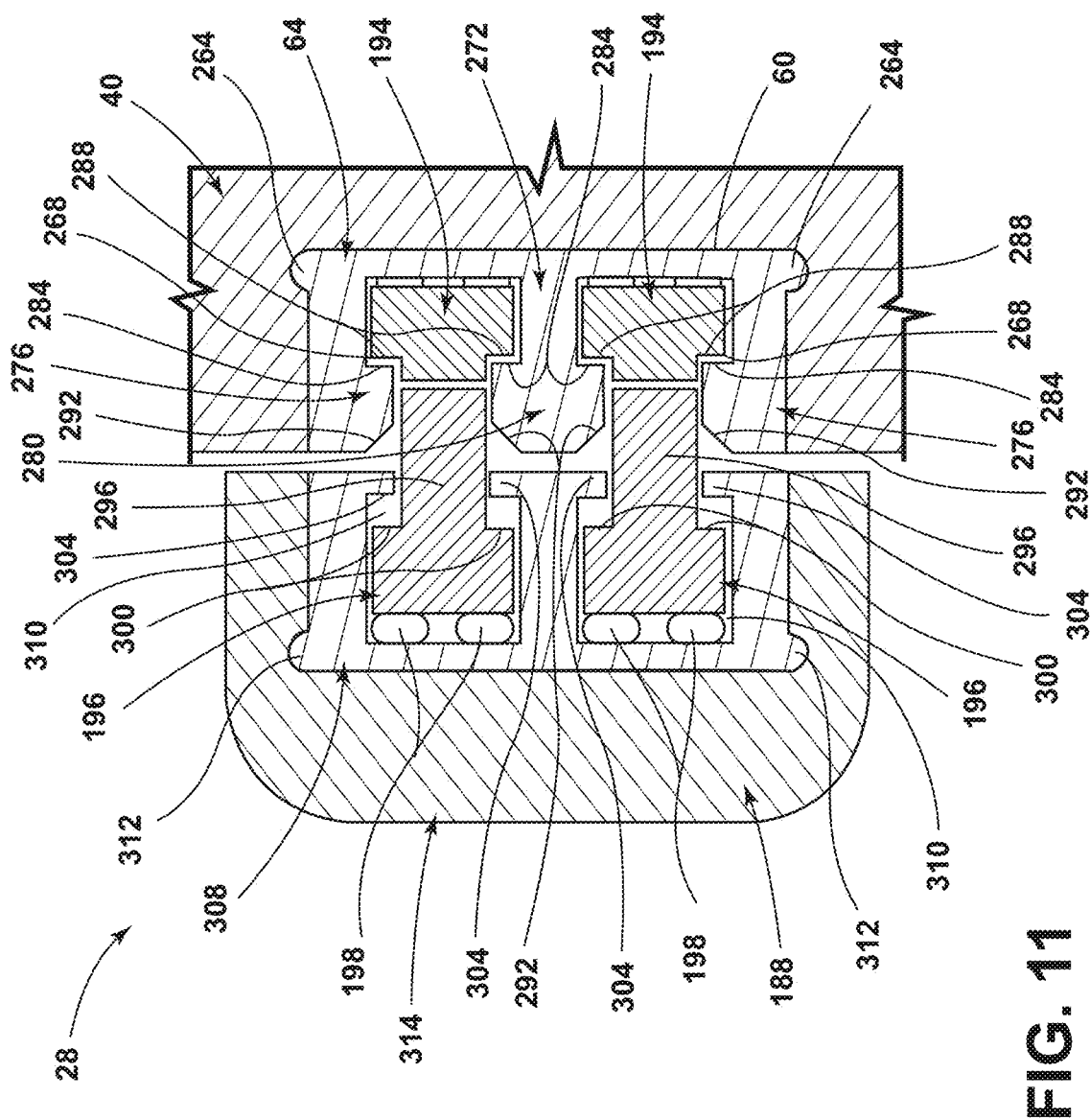
FIG. 11 is an expanded view of the track assembly, taken at section XI of FIG. 6, illustrating the engagement between conductive members and brushes, according to one example.

Referring to FIG. 11, the carriage power conductor 64 is received within the first external channel 60. The carriage power conductor 64 is provided with retention lips 264 that extend into corresponding portions of the first external channel 60 such that the carriage power conductor 64 is retained within the first external channel 60. The carriage power conductor 64 can be provided with a first thickness from which the retention lips 264 extend to define a second thickness that is greater than the first thickness. In the depicted example, the conductive members 194 are positioned within conductive member channels 268 that are defined by a body 272 of the carriage power conductor 64. The body 272 defines peripheral portions 276 that flank a central portion 280. The peripheral portions 276 and the central portion 280 each define one or more retaining protrusions 284 that aid in retention of the conductive members 194 within the conductive member channels 268. The retaining protrusions 284 on the peripheral portions 276 extend inwardly toward the central portion 280. Similarly, the retaining protrusions 284 on the central portion 280 extend outwardly toward the peripheral portions 276. The retaining protrusions 284 extend over shoulders 288 of the conductive members 194 such that an interference fit is provided between the retaining protrusions 284 and the shoulders 288. Accordingly, the conductive members 194 are retained within the conductive member channels 268 in directions that are non-parallel to a direction of travel of rail-mounted components 100 along the rail assembly 40. The peripheral portions 276 and the central portion 280 can include one or more tapered edges 292. The tapered edges 292 can aid in locating or receiving engagement portions 296 of the brushes 196 that are provided in the carriage power brush assembly 188. Said another way, upon misalignment of the brushes 196 relative to the conductive members 194, the engagement portion 296 of the brushes 196 may contact the tapered edges 292 of the peripheral and/or central portions 276, 280. In such a situation, the tapered edges 292 can aid in guiding the engagement portions 296 into contact with the conductive members 194 such that a connection is established between the carriage power brush assembly 188 and the carriage power conductor 64. The brushes 196 can include shoulders 300, similar to the shoulders 288 of the conductive members 194, which extend outwardly from a thickness of the engagement portion 296 of the brushes 196. Accordingly, the engagement portion 296 defines a first thickness of the brush 196 and the shoulders 300 define a second thickness of the brushes 196, where the second thickness is greater than the first thickness. Similar to the body 272 of the carriage power conductor 64, the carriage power brush assembly 188 can include retaining protrusions 304 that are defined by a body 308 of the carriage power brush assembly 188. The retaining protrusions 304 extend over the shoulders 300 of the brushes 196 such that the brushes 196 are retained within brush slots 310 that are defined by the body 308 of the carriage power brush assembly 188. The relative dimensions of the brushes 196 and the brush slots 310 can provide for actuation of the brush 196 relative to the associated brush slot 310. For example, the biasing members 198 in the carriage power brush assembly 188 can bias the brush 196 to an extended position such that the brush 196 is encouraged to actively engage with the conductive member 194 in the carriage power conductor 64. The engagement portion 296 of the brush 196 can have length that is longer than a length of the portion of the brush 196 that has the second thickness that defines the shoulders 300. Additionally, the brush slot 310 can be provided with dimensions that are greater than the length of the portion of the brush 196 that defines the shoulders 300. Accordingly, if the engagement portion 296 wears over time such that the length of the engagement portion 296 decreases as a function of time, the biasing members 198 can bias the brush 196 to the extended position such that the engagement portion 296 remains capable of contacting the conductive members 194. As with the body 272 of the carriage power conductor 64, the body 308 of the carriage power brush assembly 188 can define retention lips 312 that engage with a corresponding portion of a housing 314 of the carriage power brush assembly 188 such that the body 308 is retained within the carriage power brush assembly 188 in directions that are non-parallel to a direction of actuation along the rail assembly 40.

Figure 12:
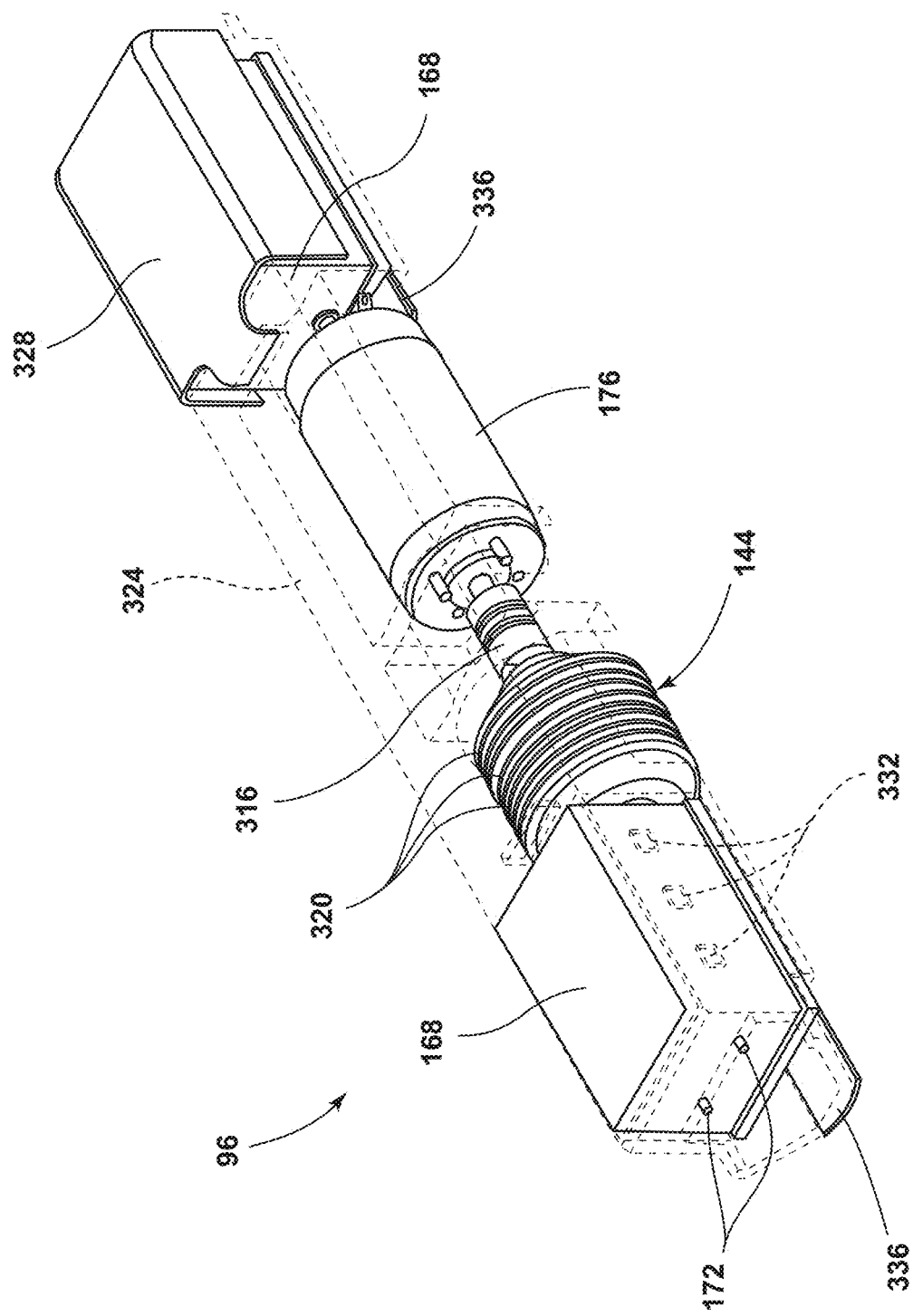
FIG. 12 is a side perspective view of the tractor assembly, illustrating components of the tractor assembly, according to one example.

Referring now to FIG. 12, the tractor assembly 96 includes one or more of the electromagnets 168. In the depicted example, the electromagnets 168 are positioned proximate to ends of the tractor assembly 96 with the worm gear 144 and the drive motor 176 positioned between the electromagnets 168. The worm gear 144 and the drive motor 176 are coupled to one another by way of a drive shaft 316 that transmits rotational motion imparted by the drive motor 176 into rotational motion of the worm gear 144. The worm gear 144 and the drive motor 176 are rotatable in at least one of a clockwise and a counter-clockwise direction. In various examples, rotation of the worm gear 144 in one of the clockwise and the counter-clockwise direction results in actuation of the tractor assembly 96 in a first direction (e.g., forward) while rotation of the worm gear 144 in the other of the clockwise and the counter-clockwise direction results in actuation of the tractor assembly 96 in a second direction (e.g., rearward). The worm gear 144 is provided with teeth 320 that engage with the teeth 140 on the drive rack 128. The engagement between the teeth 320 on the worm gear 144 and the teeth 140 on the drive rack 128 enables the rotational motion imparted to the worm gear 144 by the drive motor 176 to be translated into linear motion of the tractor assembly 96 along the drive rack 128. The components of the tractor assembly 96 can be contained within a housing 324. The housing 324 can be provided with, or define, open regions that are positioned near the one or more electromagnets 168. These open regions in the housing 324 can receive a glide cap 328. The glide cap 328 can be coupled to the housing 324 with protrusions that engage with apertures 332 that are defined by the housing 324. Coupling the glide caps 328 to the housing 324 can be accomplished by pressing the glide caps 328 onto the housing 324 where the open regions are provided, at which point, the glide cap 328 can slightly and momentarily deform or expand. Once the protrusions provided on the glide cap 328 co-localize with the apertures 332 in the housing 324 of the tractor assembly 96, the glide cap 328 can reassume its designed shape while being retained to the housing 324 of the tractor assembly 96. Said another way, the slight and momentary deformation of the glide cap 328 can store an amount of restorative energy that is ultimately released upon the coupling of the protrusions with the apertures 332.

Referring again to FIG. 12, the glide cap 328 is made from a material that has a low coefficient of friction with the material of the rail assembly 40. The glide caps 328 are positioned over the electromagnets 168 such that the glide caps 328 contact the rail assembly 40 upon activation of the electromagnets 168 rather than the electromagnets 168 or the housing 324 of the tractor assembly 96. Upon activation of the electromagnets 168, the magnetic field provided by the electromagnets 168 results in an attractive force with at least a portion of the carriage assembly 42 (e.g., the retention structure 32 and/or the carriage structure 36). Accordingly, the tractor assembly 96 may be lifted within the interior aperture 44 such that direct physical contact is made with an underside of the top side 48 of the rail assembly 40. Therefore, the glide caps 328 provide a low-friction engagement between the tractor assembly 96 and the rail assembly 40 that does not impede actuation of the tractor assembly 96 along the interior aperture 44 of the rail assembly 40. In various examples, the glide caps 328 are removable such that as the material of the glide caps 328 wears over time, the glide caps 328 can be rapidly serviced and/or replaced. Additionally, the removable nature of the glide caps 328 can allow for utilization of the tractor assembly 96 in a variety of rail assemblies 40 that may be made from materials that have varying coefficients of friction relative to one another such that a single material choice for the glide caps 328 may not be optimal for each of the rail assemblies 40. Accordingly, different glide caps 328 can be interchanged based on the rail assembly 40 material that is present in a given configuration. In some examples, the housing 324 may be made of the material that the glide caps 328 would be made of such that the glide caps 328 may be omitted and the surface of the housing 324 may provide the decreased coefficient of friction with the underside of the top side 48 of the rail assembly 40. In such an example, tractor assemblies 96 with different materials for the housing 324 may be provided and/or utilized such that a sufficiently low coefficient of friction is provided between the tractor assembly 96 and the rail assembly 40. The teeth 320 on the worm gear 144 can be provided with a sufficient depth that, upon activation of the electromagnet(s) 168 and raising of the tractor assembly 96 within the interior aperture 44, the teeth 320 on the worm gear 144 do not become decoupled from the teeth 140 on the drive rack 128. The teeth 320 on the worm gear 144 extend from a portion of the housing 324. In some examples, the tractor assembly 96 can be provided with one or more glide bars 336. The glide bars 336 can carry a load or weight of the tractor assembly 96 such that components of the tractor assembly 96 do not stick or bind in the teeth 140 of the drive rack 128 while also providing a wear-resistant and low-friction engagement between the tractor assembly 96 and the drive rack 128. Said another way, the glide bars 336 can support the tractor assembly 96 on the drive rack 128 in a low-friction manner similar to the engagement of the glide caps 328 with the rail assembly 40. Additionally, the glide bars 336 carry and distribute the weight of the tractor assembly 96 such that the worm gear 144 does not carry vertical loads that result from the weight of the tractor assembly 96. Rather, the worm gear 144 carries loads along the direction of actuation (e.g., see arrow 248).

Additionally, an amount of output torque required by the drive motor 176 may be decreased due to friction between the worm gear 144 and the drive rack 128 being decreased with the worm gear 144 not being pressed into the teeth 140 of the drive rack 128 by the weight of the tractor assembly 96.

In some examples, vehicles are provided with rails or rail assemblies that allow for macro or micro adjustments of seating assemblies that are mounted to the rails or rail assemblies. However, the present disclosure provides an improved track assembly 28 with a rail assembly 40 that is slot-less. The term slot-less is intended to refer to the absence of a slot in one or more sides of the rail assembly 40 that permits access to an interior of the rail assembly 40. Said another way, the rail assembly 40 is slot-less in that a user cannot access the interior aperture 44 from the top side 48, the first lateral side 52, the second lateral side 56 or the bottom side 80 when the rail assembly 40 is mounted to the vehicle 20. Accordingly, the interior components of the track assembly 28 that are provided in the interior aperture 44 are protected from debris, cargo items, and undesireable intrusion by a user (e.g., a finger of a user, a heal of a user's dress shoe, etc.) that can cause damage to the track assembly 28 and/or injury to the user. Therefore, the track assembly 28 of the present disclosure provides a robust solution to actuation of the rail-mounted components 100 that is well-suited for automated environments. The track assembly 28 can be oriented in various directions within the vehicle 20 (e.g., longitudinally, laterally, angularly, and/or diagonally). Additionally, the track assembly 28 can be arranged in a network such that the rail-mounted components 100 can traverse the cabin 24 in a variety of directions rather than a binary actuation in fore-aft or side-to-side direction. Instead, it is within the scope of the present disclosure for the rail-mounted components 100 to be able to transition between track assemblies 28 that are arranged at angles to one another (e.g., from longitudinal to lateral, from lateral to longitudinal, from longitudinal to angular, from angular to longitudinal, from lateral to angular, from angular to lateral, and so on).

According to a first aspect of the present disclosure, the track assembly 28 for the vehicle 20 includes the rail assembly 40. The rail assembly 40 defines interior aperture 44. The interior aperture 44 is inaccessible from the top side 48, the first lateral side 52, and the second lateral side 56 of the rail assembly 40.

Embodiments of the first aspect of the present disclosure can include any one or a combination of the following features:
- the top side 48 is directly opposite the bottom side 80 of the rail assembly 40, wherein the bottom side 80 is mounted to the vehicle 20;
- the track assembly 28 further includes the first external channel 60 defined by the first lateral side 52 of the rail assembly 40, and the second external channel 68 is defined by the second lateral side 56 of the rail assembly 40;
- the first external channel 60 receives one of the carriage power conductor 64 and the carriage data conductor 72 and the second external channel 68 receives the other of the carriage power conductor 64 and the carriage data conductor 72;
- the track assembly 28 further includes the first interior channel 76 defined by the first lateral side 52 of the rail assembly 40 and the second interior channel 88 defined by the second lateral side 56 of the rail assembly 40;
- the first interior channel 76 and the second interior channel 88 are each positioned within the interior aperture 44 of the rail assembly 40;
- the first interior channel 76 receives one of the tractor power conductor 84 and the tractor data conductor 92 and the second interior channel 88 receives the other of the tractor power conductor 84 and the tractor data conductor 92;
- the track assembly 28 further includes the locking rail 208 positioned in at least one of the first lateral side 52 and the second lateral side 56 of the rail assembly 40;
- the track assembly 28 further includes the retention structure 32 movably engaging with the rail assembly 40, wherein the retention structure 32 is movable between locked and unlocked positions relative to the locking rail 208;
- the retention structure 32 is biased to the locked position;
- the retention structure 32 is provided made of a material that is susceptible to magnetic fields;
- the retention structure 32 is actuated from the locked position to the unlocked position when the retention structure 32 is exposed to a magnetic field;
- the track assembly 28 further includes the tractor assembly 96 that movably couples with the rail assembly 40 within the interior aperture 44, the tractor assembly 96 including the electromagnet 168 that can be selectively engaged to place the retention structure 32 in the unlocked position, wherein the tractor assembly 96 receives power from the tractor power conductor 84;
- the magnetic field imparted by the tractor assembly 96 transmits motion to the retention structure 32 as the tractor assembly 96 is moved within the rail assembly 40;
- the track assembly 28 further includes the tractor assembly 96 movably couples with the rail assembly 40 within the interior aperture 44;
- the track assembly 28 further includes the retention structure 32 and the carriage structure 36 with the carriage structure 36 extending through the retention structure 32 to engage with the rail assembly 40 in a manner that permits the carriage structure 36 to receive power from the carriage power conductor 64, as well as receive data from the carriage data conductor 72; and
- the track assembly 28 is installed in the vehicle 20.

According to a second aspect of the present disclosure, the vehicle 20 includes the cabin 24. The track assembly 28 is coupled to a portion of the cabin 24. The track assembly 28 includes the retention structure 32, the carriage structure 36, and the rail assembly 40. The carriage structure 36 extends through the retention structure 32. The rail assembly 40 receives the retention structure 32 and the carriage structure 36 such that the retention structure 32 and the carriage structure 36 slidably couple with the rail assembly 40. The rail assembly 40 defines the interior aperture 44. The interior aperture 44 is inaccessible from the top side 48, the first lateral side 52, and the second lateral side 56 of the rail assembly 40. The first external channel 60 is defined by the first lateral side 52 of the rail assembly 40. The carriage power conductor 64 is received within the first external channel 60. The second external channel 68 is defined by the second lateral side 56 of the rail assembly 40. The carriage data conductor 72 is received within the second external channel 68. The first interior channel 76 is defined by the first lateral side 52 of the rail assembly 40. The tractor power conductor 84 is received within the first interior channel 76. The second interior channel 88 is defined by the second lateral side 56 of the rail assembly 40. The first and second interior channels 76, 88 are each positioned within the interior aperture 44 of the rail assembly 40. The tractor data conductor 92 is received within the second interior channel 88. The tractor assembly 96 movably couples with the rail assembly 40 within the interior aperture 44.

Embodiments of the second aspect of the present disclosure can include any one or a combination of the following features:

the locking rail 208 positioned in at least one of the first lateral side 52 and the second lateral side 56 of the rail assembly 40, the locking rail 208 receiving at least a portion of the retention structure 32, and the retention structure 32 is movable between locked and unlocked positions relative to the locking rail 208; and the retention structure 32 is biased to the locked position, the retention structure 32 is made of a material that is susceptible to magnetic fields, and the retention structure 32 is actuated from the locked position to the unlocked position when the retention structure 32 is exposed to a magnetic field.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A track assembly for a vehicle, comprising:
a rail assembly defining an interior aperture, the interior aperture being inaccessible from a top side, a first lateral side, and a second lateral side of the rail assembly;
a carriage assembly that is movable relative to the rail assembly;
a first interior channel defined by the first lateral side of the rail assembly; and
a second interior channel defined by the second lateral side of the rail assembly.

2. The track assembly for a vehicle of claim 1, wherein the top side is directly opposite a bottom side of the rail assembly, and wherein the bottom side is mounted to the vehicle.

3. The track assembly for a vehicle of claim 1, further comprising:
a first external channel defined by the first lateral side of the rail assembly; and
a second external channel defined by the second lateral side of the rail assembly, wherein the first external channel receives one of a carriage power conductor and a carriage data conductor, and wherein the second external channel receives the other of the carriage power conductor and the carriage data conductor.

4. The track assembly for a vehicle of claim 1, wherein the first interior channel and the second interior channel are each positioned within the interior aperture of the rail assembly.

5. The track assembly for a vehicle of claim 1, wherein the first interior channel receives one of a tractor power conductor and a tractor data conductor, and wherein the second interior channel receives the other of the tractor power conductor and the tractor data conductor.

6. The track assembly for a vehicle of claim 1, further comprising:
a locking rail positioned in at least one of the first lateral side and the second lateral side of the rail assembly.

7. The track assembly for a vehicle of claim 6, further comprising:
a retention structure that movably engages with the rail assembly, wherein the retention structure is movable between locked and unlocked positions relative to the locking rail, wherein the retention structure is biased to the locked position.

8. The track assembly for a vehicle of claim 7, wherein the retention structure is made of a material that is susceptible to magnetic fields, wherein the retention structure is actuated from the locked position to the unlocked position when the retention structure is exposed to a magnetic field.

9. The track assembly for a vehicle of claim 8, further comprising:
a tractor assembly that movably couples with the rail assembly within the interior aperture, the tractor assembly comprising an electromagnet that can be selectively engaged to place the retention structure in the unlocked position, wherein the tractor assembly receives power from a tractor power conductor, and wherein the magnetic field imparted by the tractor assembly transmits motion to the retention structure as the tractor assembly is moved within the rail assembly.

10. The track assembly for a vehicle of claim 1, further comprising:
a tractor assembly that movably couples with the rail assembly within the interior aperture.

11. The track assembly for a vehicle of claim 1, wherein the carriage assembly comprises:
a retention structure; and
a carriage structure that extends through the retention structure to engage with the rail assembly in a manner that permits the carriage structure to receive power from a carriage power conductor, as well as receive data from a carriage data conductor.

12. The track assembly for a vehicle of claim 1, wherein the track assembly is installed in a vehicle.

13. A track assembly for a vehicle, comprising:
a rail assembly defining an interior aperture, the interior aperture being inaccessible from a top side, a first lateral side, and a second lateral side of the rail assembly;
a carriage assembly that is movable relative to the rail assembly; and
a locking rail positioned in at least one of the first lateral side and the second lateral side of the rail assembly.

14. The track assembly for a vehicle of claim 13, further comprising:
a first interior channel defined by the first lateral side of the rail assembly; and
a second interior channel defined by the second lateral side of the rail assembly.

15. The track assembly for a vehicle of claim 13, further comprising:
a tractor assembly that movably couples with the rail assembly within the interior aperture.

16. The track assembly for a vehicle of claim 13, wherein the track assembly is installed in a vehicle.

17. A track assembly for a vehicle, comprising:
a rail assembly defining an interior aperture, the interior aperture being inaccessible from a top side, a first lateral side, and a second lateral side of the rail assembly;
a carriage assembly that is movable relative to the rail assembly; and
a tractor assembly that movably couples with the rail assembly within the interior aperture.

18. The track assembly for a vehicle of claim 17, further comprising:
a locking rail positioned in at least one of the first lateral side and the second lateral side of the rail assembly.

19. The track assembly for a vehicle of claim 17, further comprising:
a first interior channel defined by the first lateral side of the rail assembly; and
a second interior channel defined by the second lateral side of the rail assembly.

20. The track assembly for a vehicle of claim 17, wherein the track assembly is installed in a vehicle.

* * * * *